United States Patent [19]

Kirchweger

[11] Patent Number: 4,598,786
[45] Date of Patent: Jul. 8, 1986

[54] MOTOR VEHICLE WITH A SOUND-ABSORBING CAPSULE FOR THE DRIVING ENGINE

[75] Inventor: Karl Kirchweger, Graz, Austria

[73] Assignee: A V L Gesellschaft für Verbrennungskraftmaschinen und Messtechnik m.b.H. Prof. Dr. Dr. h.c. Hans List, Graz, Austria

[21] Appl. No.: 764,964

[22] Filed: Aug. 12, 1985

Related U.S. Application Data

[63] Continuation-in-part of Ser. No. 506,799, Jun. 22, 1983, abandoned.

[30] Foreign Application Priority Data

Jul. 1, 1982 [AT] Austria .................................... 2557/82
Aug. 19, 1982 [AT] Austria .................................... 3159/82

[51] Int. Cl.⁴ ............................................ B60K 11/00
[52] U.S. Cl. .................................... 180/68.1; 181/204
[58] Field of Search ................... 180/68.1, 68.2, 68.3, 180/68.4, 68.6, 69.22, 297; 181/204, 205; 123/41.7, 41.6

[56] References Cited

U.S. PATENT DOCUMENTS

| | | | |
|---|---|---|---|
| 3,205,964 | 9/1965 | Henry-Brabaud | 180/68.1 |
| 3,696,730 | 10/1972 | Masuda et al. | 180/68.1 |
| 3,769,898 | 11/1973 | Ide | 98/2 |
| 4,240,517 | 12/1980 | Harlow, Jr. et al. | 180/297 |

FOREIGN PATENT DOCUMENTS

| | | | |
|---|---|---|---|
| 2620774 | 12/1976 | Fed. Rep. of Germany | 180/68.1 |
| 2703227 | 8/1978 | Fed. Rep. of Germany | 180/68.1 |
| 54-138235 | 10/1979 | Japan | 180/297 |

*Primary Examiner*—John J. Love
*Assistant Examiner*—Mark C. Dukes
*Attorney, Agent, or Firm*—Watson, Cole, Grindle & Watson

[57] ABSTRACT

In a motor vehicle a water-cooled internal combustion engine serving as the driving engine is enclosed by a sound-absorbing capsule partly formed by the surrounding parts of the vehicle. At the front wall of this capsule a housing is provided to receive the air flowing off from the radiator, from which housing a closed air duct passes through the capsule, leading into the outside at one of the other capsule walls.

10 Claims, 7 Drawing Figures

MOTOR VEHICLE WITH A SOUND-ABSORBING CAPSULE FOR THE DRIVING ENGINE

This application is a continuation-in-part of application Ser. No. 506,799, filed June 22, 1983, now abandoned.

BACKGROUND OF THE INVENTION

The present invention relates to a motor vehicle comprising a water-cooled internal combustion engine as a driving engine which, together with its flange-mounted gear-box, is enclosed by a sound-absorbing capsule, and a radiator and a fan, the walls of the sound-absorbing capsule being at least partly formed by the surrounding parts of the vehicle, its top being constituted by the hood of the engine, while its lower side is closed by a separate bottom plate.

DESCRIPTION OF THE PRIOR ART

A vehicle of this kind is known, e.g., from German laid-open print No. 26 20 774, which is powered by an engine located at the front of the vehicle, whose crankshaft axis is parallel to the longitudinal vehicle axis. In this type vehicle, the radiator/fan assembly with its electrically driven radiator fan is mounted at the front end of the car between the front wall of the sound-absorbing capsule and the radiator grille, with adequate space between the off-air side of the radiator fan and the adjacent capsule wall, so that the heated off-air from the radiator/fan assembly may flow off freely. In view of the compact design of today's ever more popular small cars this will leave little extra space for housing the radiator/fan assembly.

Another vehicle of the above type is known, e.g., from German laid-open print No. 27 03 227 which is provided with a transversely positioned engine at the front of the vehicle. Again, the radiator/fan assembly is located at the front end of the vehicle in order to be able to utilize the dynamic pressure which will suffice for cooling the engine, above all at the higher vehicle velocities. In this case there is no special partition wall behind the radiator fan separating it from the sound-absorbing capsule, and the outflowing cooling air is passed directly into the capsule for ventilation and cooling. This implies, however, that the inlet and outlet openings where the cooling air enters and leaves the capsule—whose dimensions must be geared to the requirements of the radiator/fan assembly and are therefore oversized for ventilation of the capsule—will have to be sound-proofed against any noise radiating from the capsule interior, which necessitates the use of expensive and large-size mufflers. In this way a good deal of the space gained by mounting the engine transversely, cannot be utilized when reducing the outer dimensions of the vehicle.

SUMMARY OF THE INVENTION

It is an object of the present invention to avoid the above disadvantage of known vehicles of the aforementioned type, and to improve a vehicle of this kind in such a way as to simplify the design of the radiator/fan assembly and to improve its operation, while permitting a most compact design of the car at the same time.

According to the present invention this is achieved by providing a housing for receiving the cooling air flowing off from the radiator, which is closed against the interior of the capsule and which constitutes part of the front wall of the capsule, and by further providing a closed air duct within the capsule carrying the outflow of cooling air and leading from the above housing to the outside through one of the other walls of the capsule. This will eliminate the need for any extra space on the off-air side of the radiator permitting the cooling air to flow off without any losses between the radiator fan and the capsule wall, which would unnecessarily add to the outer dimensions of the vehicle; in addition, passing the off-air from the fan through the capsule in a closed duct of a relatively large cross-section—as proposed by the present invention—will make superfluous any additional mufflers for the cooling air, which would occupy considerable space and would increase costs. In this way cooling and ventilation of the interior of the capsule is totally independent of the cooling system of the combustion engine proper, which will greatly simplify design because of the minimal amount of air required for cooling/ventilation of the capsule alone. The spare space in the engine compartment which is particularly scarce in today's compact cars, may be put to optimum use by configuring the off-air system in the above mentioned manner.

For a vehicle with a transversely mounted engine, a particularly advantageous embodiment of the present invention provides that the air duct should pass through the capsule beside the cylinder block and above the flanged-on gear-box of the internal combustion engine. Since the height of the gear-box of driving engines for motor vehicles is considerably smaller than the cylinder block, there is enough room above the gear-box which may be utilized to advantage for the purposes of the present invention and which lends itself to the dissipation of cooling air in a favorable manner from the standpoint of flow dynamics.

In an enhanced version of the invention the air duct bends sideways and opens into a wheelguard of the vehicle on the side of the gear-box. In this way, the necessary outlet opening of the air duct will not increase the overall length of the vehicle, thereby permitting a most compact design of the engine compartment.

Other structural details permitting, the air duct may curve downwardly behind the gear-box and may open to the outside at the bottom of the vehicle. If there is not enough room between the gear-box and the splashboard separating the engine compartment from the vehicle interior, another embodiment of the invention proposes that an additional wall be inserted in front of the splashboard of the engine compartment, which is to serve as a rear wall of the capsule; in this case the air duct will open into the chamber between the splashboard and the additional wall, which is open at the bottom of the vehicle. Since the chamber between splashboard and additional wall extends over the whole width of the vehicle, the distance between splashboard and wall may be kept small, which again will help to reduce the vehicle dimensions.

In this context it will be of particular advantage to support the additional wall with flexible elements against the splashboard of the vehicle, as proposed in another enhanced embodiment of this invention, since this will ensure a better sound-proofing between the engine compartment and the vehicle interior than would be obtained by a single partition wall of equivalent weight.

According to another favorable embodiment the air duct passing through the capsule and carrying the stream of off-air from the radiator/fan assembly includes a flexible hose which may be attached for instance to suitable fittings at the walls of the capsule. It is also permissible, however, that the air duct should partly be formed by sections of the walls of the sound-absorbing capsule, which would simplify assembly and maintenance in certain cases.

The air may be propelled through the radiator/fan assembly of the combustion engine in a conventional manner, e.g., by means of an electric fan, which is activated by a thermo-sensor as soon as the cooling water has reached a certain temperature. This fan is effective mainly in the low speed ranges of the vehicle or when the car is at a standstill, whereas in the medium and high speed ranges the naturally occurring dynamic pressure is utilized. With the increasing power output of the driving engine the amount of heat to be dissipated via the radiator also increases, so that the cross-section of the air duct passing through the capsule may no longer be sufficient. In order to ensure an adequate flow of cooling air through the radiator another enhanced embodiment of the present invention provides for a flap opening to the outside on the bottom of the housing of the radiator/fan assembly, which will open automatically as soon as the dynamic pressure has reached a certain level.

In another favorable embodiment of this invention the fan is positioned at the end of the air duct adjacent the housing. In this way the greater amount of air encountered at the higher vehicle velocities may be coped with easily. If the fan is placed in front of the radiator of the combustion engine it may happen at the higher vehicle velocities that the cross-section of the air duct passing through the capsule is not large enough, which will entail an excessive build-up of cooling air in the housing before entrance into the air duct. In this event a sufficient flow of cooling air through the radiator is ensured by providing an opening at the bottom of the housing through which part of the cooling air passing through the radiator may flow to the outside. According to another embodiment of the present invention this may even be improved by the use of a spoiler on the lower front edge of the engine/radiator hood, which will produce a partial vacuum at the higher vehicle velocities in the area of the lower air outlet opening of the housing.

DESCRIPTION OF THE DRAWINGS

Following is a more detailed description of the present invention as illustrated by the variants in the enclosed drawings, wherein.

In all variants, identical components are marked with identical reference numerals.

DESCRIPTION OF THE PREFERRED EMBODIMENTS

Figure 1:
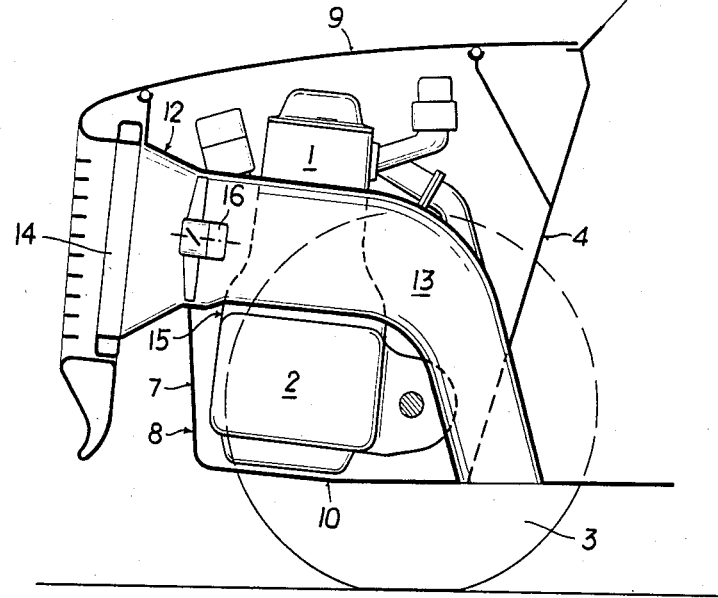
FIG. 1 is a schematic view of a detail of a vehicle designed according to the present invention (longitudinal section)
Figure 2:
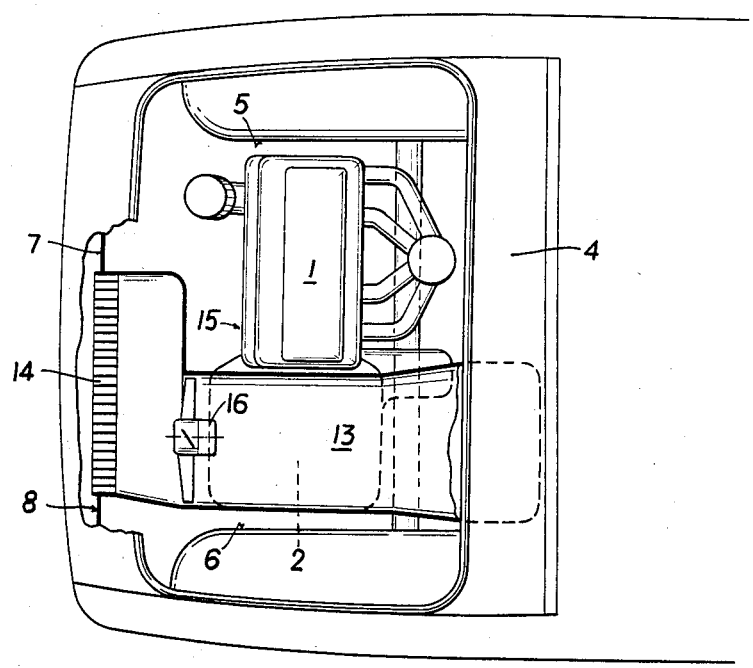
FIG. 2 is a top view of the embodiment of FIG. 1, with the hood of the engine removed.

The motor vehicle presented in FIGS. 1 and 2 is a small car with a front-wheel drive. A water-cooled internal combustion engine 1 is used as a driving engine which acts upon the front wheel 3 of the car via a flange-mounted gear-box 2. The combustion engine 1 and its flanged-on gear-box 2 are enclosed by a sound-absorbing capsule 8 whose walls 4, 5, 6, 7 are at least partly formed by the surrounding parts of the vehicle, the top of the capsule being formed by the engine hood 9 of the vehicle while its bottom is provided by a separate bottom plate 10. For the flow of cooling air from the radiator 14 a closed air duct 13 is provided within the capsule 8, starting at the backside of the housing 12 which faces the interior of the capsule 8, and curving down along the rear wall 4 of the capsule where it leads to the outside.

For propelling the cooling air an electrically powered fan 16 is provided which is switched on automatically as soon as the cooling water has reached a certain temperature, sucking cooling air through the radiator 14 into the housing 12. The fan 16 is located in the air duct 13 at the end adjacent the housing 12, i.e., approximately where the air duct 13 passes through the front wall 7 of the capsule 8. At the higher vehicle velocities, the dynamic pressure building up in front of the radiator 14 because of the vehicle motion is utilized for the propulsion of air through the radiator.

Inside the sound-absorbing capsule 8 the air duct 13 is located adjacent the cylinder block 15 of the internal combustion engine 1 and above the flange-mounted gear-box 2, permitting a most economic use of the capsule interior since the gear-box 2 is lower than the cylinder block 15.

Figure 3:
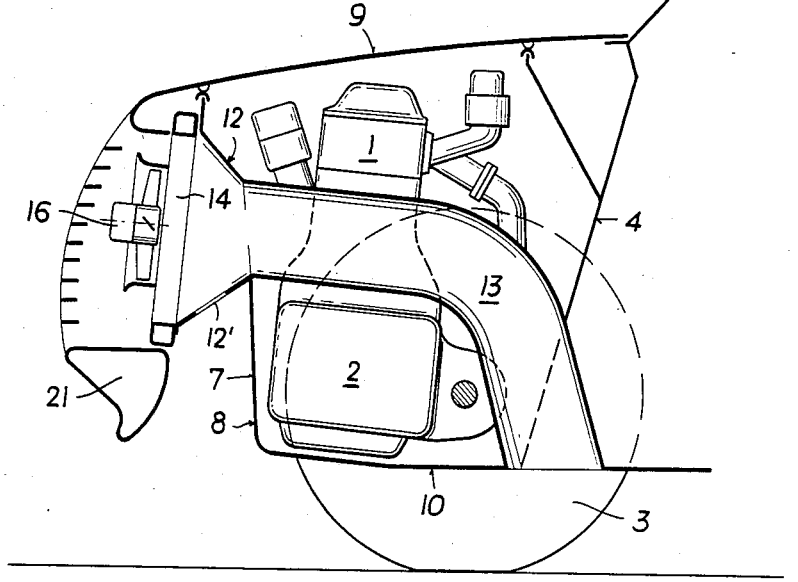
FIG. 3 is a view similar to that of FIG. 1 of another variant of the invention.

The variant according to FIG. 3 differs from that of FIGS. 1 and 2 only in that the fan 16 is located in front of the radiator 14, and the housing 12 is additionally provided with an air outlet opening 12' directed downwardly and to the open exterior. Again the dynamic pressure which is considerable at the higher velocities, is utilized for the propulsion of cooling air, the problem being that the comparatively narrow air duct 13 may not be able to cope with the large quantities of cooling air flowing off. This is avoided by providing the bottom of the housing 12 with opening 12' into the open, through which part of the cooling air may flow off. Preferably, the two flow paths should have the same capacity, although it is also conceivable that one of the flow paths, e.g., that through air duct 13, is given priority by shaping and dimensioning it accordingly. The effect of the outlet opening 12' is improved by providing the lower front edge of the engine/radiator hood with a spoiler 21 which will create a partial vacuum in the area beneath the lower opening 12' of the housing 12, thereby adding to the effect of the dynamic pressure inside the housing, especially at the higher vehicle velocities.

Figure 4:
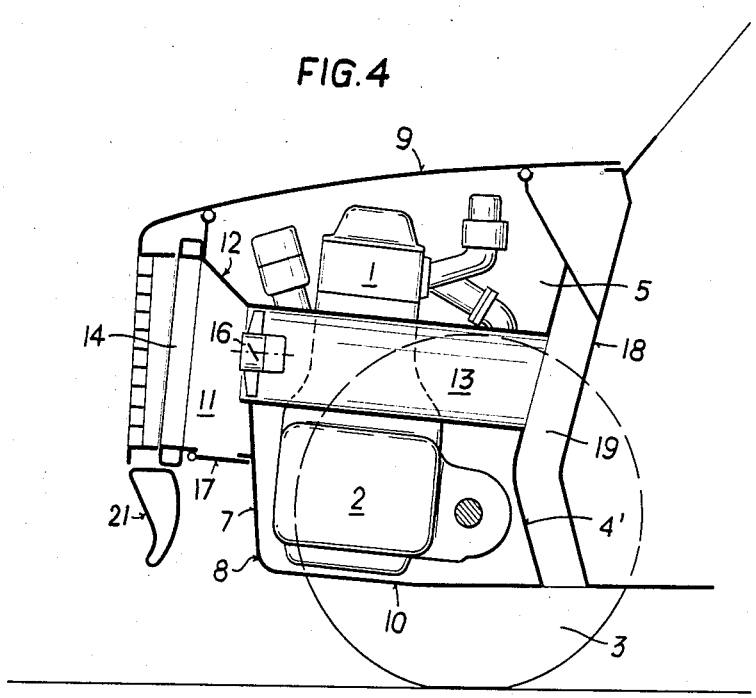
FIG. 4 is a view similar to that of FIG. 1 of still another variant.

The variant according to FIG. 4 differs from that of FIGS. 1 and 2 only in that an additional wall 4' is provided as the rear wall of the capsule in front of the splashboard 18 of the engine compartment, and the air duct 13 terminates in the chamber 19 formed between splashboard 18 and additional wall 4', which is open towards the bottom of the vehicle. As this chamber 19 may extend over the entire width of the vehicle, the distance between additional wall 4' and splashboard 18 may be selected rather small, which will ensure a most economical use of the overall space available while still permitting the cooling air from the air duct 13 to flow off freely.

For a better sound-proofing between the engine compartment and the interior of the motor car, the additional wall 4' may be supported against the splashboard 18 of the vehicle by means of flexible elements in a manner not shown in the drawings.

In order to prevent the relatively narrow air duct 13 from blocking the free flow of cooling air, the bottom of the housing 12 of the radiator/fan assembly 11 is provided with a flap 17 leading to the outside, which will open automatically as soon as the dynamic pressure inside the housing 12 exceeds a given level, thus enabling the cooling air forced through the radiator 14 to flow off freely. The effect of flap 17 again is enhanced by spoiler 21 at the lower front edge of the engine/radiator hood, which will create a partial vacuum underneath flap 17 in addition to the effect of the dynamic pressure inside the housing 12, especially at the higher vehicle velocities.

For the other features of the variant in FIG. 4 cf. FIGS. 1 and 2, identical parts are marked with identical reference numerals.

Figure 5:
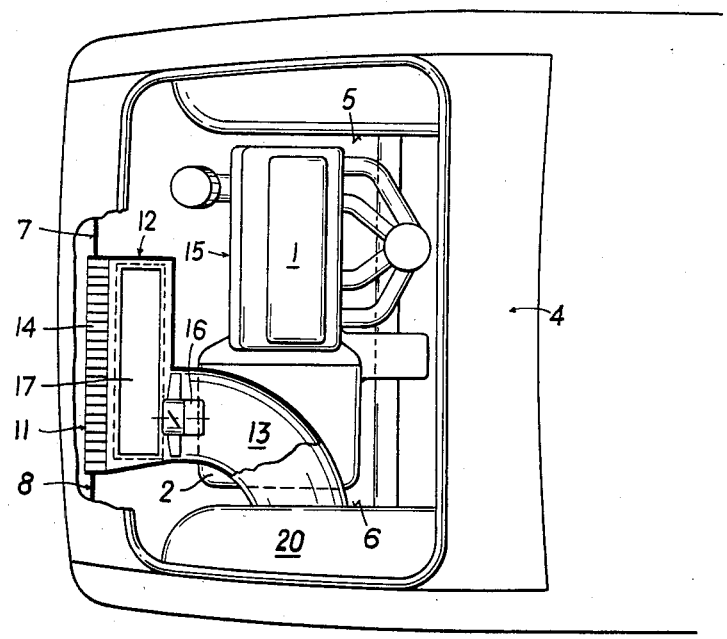
FIG. 5 is a view similar to that of FIG. 2 of yet another variant.

The variant outlined in FIG. 5 differs from the above variants only in that the air duct 13 bends sideways and opens into the wheelguard 20 of the vehicle on the side of the gear-box. In this manner the overall length of the motor vehicle is reduced since no extra space is required for the outlet opening of the air duct behind the driving engine. As regards the other characteristics of this variant—reference is made to the above. Identical parts again are marked with identical numerals.

Figure 6:
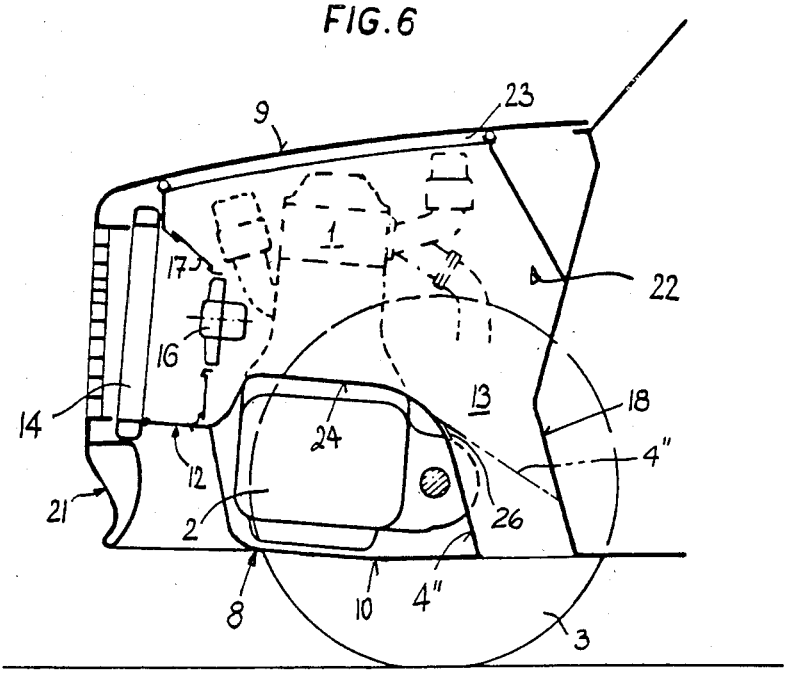
FIG. 6, a view similar to that of FIG. 1 of yet another variant of the invention.
Figure 7:
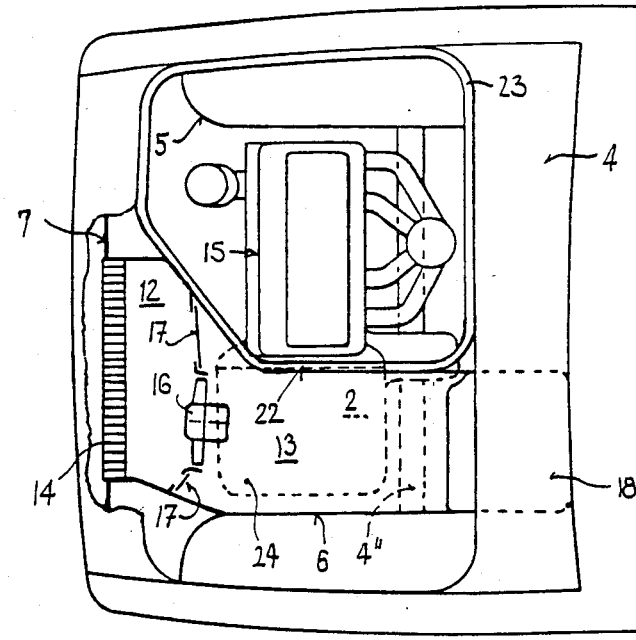
FIG. 7 is a top view of the embodiment of FIG. 6, with the hood of the engine removed.

The variant according to FIGS. 6 and 7 is similar in many respects to the aforedescribed embodiments herein, such that like parts are identified by like reference numerals. However, in the FIGS. 6 and 7 embodiment, air duct 13 is delimited by side wall 6 of sound-absorbing capsule 8 as well as by engine hood 9. Openings could also be provided in side wall 6 to increase the outflow of cooling air to the outside of the capsule. A wall 22 lying adjacent the engine and opposite side wall 6 extends up to the engine hood 9 and provides a seal with the engine hood through a circular seal 23. The lower limit of air duct 13 is formed by a wall 24 which overlies gear-box 2 and which also serves to baffle the noise of blower 16. As in the other embodiments, plate 10 forms the lower wall of capsule 8 and the air duct opens through this wall.

When the vehicle is in motion, dynamic pressure largely replaces the effect of blower 16. In this case flaps 17 will open which allows a bypassing of blower 16. Although not shown, the blower could also be located in front of radiator 14 as a pressure blower or directly behind the radiator as a suction blower. With such arrangement, a detour for the air directly toward the bottom of the capsule could be effected.

As a result of the partial inclusion of the wall parts of the sound insulating capsule to define the air duct for exhausting the radiator air which escapes from the blower, both the manufacture and assembly of the motor vehicle is simplified and an advantageous utilization of the motor vehicle's available interior space for the motor unit is made possible.

The air duct of the FIGS. 6 and 7 embodiment likewise includes a wall 4" extending between walls 6 and 22, and lying in front of a splash board 18 of the engine compartment.

For a better sound-proofing between the engine compartment and the interior of the motor car, wall 4" may be supported against splashboard 18 of the vehicle, as shown in phantom outline in FIG. 6, by means of flexible elements 26.

Flaps 17 of housing 12 of the radiator/fan assembly 11 will automatically open as soon as the dynamic pressure inside housing 12 exceeds a given level. Thus, the cooling air forced through the radiator 14 freely flows into air duct 13 and bypasses blower 16.

In all variants shown and described above provisions are made for an air duct 13 starting at a housing 12 adjacent the front wall 7 of the sound-absorbing capsule 8 and ending at one of the other walls of the capsule, where it leads to the outside, which duct will carry through the sound-absorbing capsule at least part of the cooling air from the radiator 14, thereby eliminating the need for inlet and outlet mufflers for the off-air from the radiator, and permitting a most compact design of the car, especially if the driving engine is mounted transversely (as shown).

But even if the engine is mounted lengthwise, the measures proposed by the present invention will help to make better use of the available space.

I claim:

1. A motor vehicle, comprising a water-cooled internal combustion driving engine transversely mounted and having a flange-mounted gearbox, a radiator and an associated fan, walls defining a completely enclosed, sound-absorbing capsule containing said engine and said gearbox, said walls being at least partly formed by surrounding parts of the vehicle and a top comprising an engine hood of the vehicle, and one of said walls comprising a separate bottom plate at the lower side of said capsule, a separate housing located within said capsule for receiving cooling air flowing off from said radiator, said housing being closed relative to the interior of said capsule and comprising part of a front wall of said capsule, an air duct located within said capsule and being closed relative to the interior of said capsule, said air duct being partly formed by at least one section of the walls of said surrounding capsule and being in open communication with said housing for carrying the outflow of cooling air and leading from said housing to the outside of said capsule through another of said walls thereof, and said air duct extending through said capsule, adjacent a cylinder block of said engine and lying above said gearbox.

2. A motor vehicle as in claim 1, further comprising wheelguards, wherein said air duct bends sideways and opens into said wheelguard of said vehicle on the side of said gear-box.

3. A motor vehicle as in claim 1, having a splashboard serving as the rear wall of said capsule, wherein an additional wall is provided in front of said splashboard, and wherein said air duct opens into a chamber located between said splashboard and said additional wall, which is open at the bottom of the vehicle.

4. A motor vehicle as in claim 3, further comprising flexible elements for supporting said additional wall against said splashboard of said vehicle.

5. A motor vehicle as in claim 1, wherein said air duct comprises a flexible hose.

6. A motor vehicle as in claim 1, wherein a bottom of said housing of said radiator/fan assembly is provided with a flap leading to the outside which opens automatically once a given dynamic pressure is exceeded.

7. A motor vehicle as in claim 1, wherein said fan is located at that end of said air duct adjacent said housing.

8. A motor vehicle as in claim 1, wherein said fan is located in front of said radiator of said combustion engine and wherein an additional air outlet opening is provided at a bottom of said housing leading into the outside.

9. A motor vehicle as in claim 8, wherein a spoiler is provided on a lower front edge of said engine hood for producing a partial vacuum at higher vehicle velocities in the area of said lower air outlet opening of said housing.

10. A motor vehicle as claimed in claim 1, wherein said housing is provided with at least one flap leading to said air duct, said flap opening automatically once a given dynamic pressure is exceeded so as to bypass said fan.

* * * * *